(12) United States Patent
Jung et al.

(10) Patent No.: US 12,493,028 B2
(45) Date of Patent: Dec. 9, 2025

(54) MICROPARTICLES FOR DETECTING BIOLOGICAL MATERIALS AND METHOD FOR DETECTING BIOLOGICAL MATERIALS USING THE SAME

(71) Applicant: EZDIATECH INC., Cheonan-si (KR)

(72) Inventors: Yong-Gyun Jung, Seoul (KR); Joo Ho Kim, Yongin-si (KR); Wook Park, Yongin-si (KR); Suk-Heung Song, Suwon-si (KR); Gyu Dong Kim, Anyang-si (KR)

(73) Assignee: EZDIATECH INC., Cheonan-si (KR)

( * ) Notice: Subject to any disclaimer, the term of this patent is extended or adjusted under 35 U.S.C. 154(b) by 1173 days.

(21) Appl. No.: 17/285,890

(22) PCT Filed: Oct. 16, 2019

(86) PCT No.: PCT/KR2019/013613
§ 371 (c)(1),
(2) Date: Apr. 15, 2021

(87) PCT Pub. No.: WO2020/080833
PCT Pub. Date: Apr. 23, 2020

(65) Prior Publication Data
US 2021/0341470 A1    Nov. 4, 2021

(30) Foreign Application Priority Data

Oct. 17, 2018  (KR) .................. 10-2018-0123484

(51) Int. Cl.
| | | |
|---|---|---|
| G01N 33/543 | (2006.01) | |
| B82Y 5/00 | (2011.01) | |
| B82Y 25/00 | (2011.01) | |
| B82Y 30/00 | (2011.01) | |
| B82Y 35/00 | (2011.01) | |
| G01N 33/553 | (2006.01) | |
| G01N 33/58 | (2006.01) | |
| B82Y 40/00 | (2011.01) | |

(52) U.S. Cl.
CPC . *G01N 33/54326* (2013.01); *G01N 33/54346* (2013.01); *G01N 33/553* (2013.01); *G01N 33/581* (2013.01); *G01N 33/582* (2013.01); *B82Y 5/00* (2013.01); *B82Y 25/00* (2013.01); *B82Y 30/00* (2013.01); *B82Y 35/00* (2013.01); *B82Y 40/00* (2013.01)

(58) Field of Classification Search
CPC ....... G01N 33/54326; G01N 33/54346; G01N 33/553; B82Y 5/00; B82Y 30/00; B82Y 35/00; B82Y 40/00
See application file for complete search history.

(56) References Cited

U.S. PATENT DOCUMENTS

| | | | | |
|---|---|---|---|---|
| 2003/0129608 A1* | 7/2003 | Mirkin | ............... | C01G 7/00 |
| | | | | 435/6.12 |
| 2008/0199884 A1* | 8/2008 | Ohnishi | ........... | G01N 33/56905 |
| | | | | 435/7.2 |
| 2009/0263331 A1* | 10/2009 | Wu | ............... | A61K 49/1857 |
| | | | | 424/9.42 |
| 2012/0315623 A1* | 12/2012 | Alocilja | .......... | B82Y 15/00 |
| | | | | 435/7.1 |
| 2013/0053471 A1* | 2/2013 | Studart | ............ | C08J 5/10 |
| | | | | 523/115 |
| 2014/0124696 A1* | 5/2014 | Guo | ............... | B82Y 30/00 |
| | | | | 427/127 |
| 2014/0227679 A1 | 8/2014 | Lee et al. | | |
| 2014/0308756 A1* | 10/2014 | Gautier | ............ | B22F 1/056 |
| | | | | 436/501 |
| 2016/0320376 A1 | 11/2016 | Gohel et al. | | |

FOREIGN PATENT DOCUMENTS

| | | |
|---|---|---|
| CN | 1328641 A | 12/2001 |
| CN | 2416277 A1 | 1/2002 |
| CN | 1454313 A | 11/2003 |
| CN | 2681377 A1 | 9/2008 |
| CN | 102884431 A | 1/2013 |
| CN | 102323412 B | 1/2014 |
| CN | 103988081 A | 8/2014 |
| KR | 100759716 B1 | 10/2007 |
| KR | 20110105210 A | 9/2011 |
| KR | 20140055563 A | 5/2014 |
| KR | 20140094035 A | 7/2014 |
| KR | 20140098285 A | 8/2014 |
| KR | 101484743 B1 | 1/2015 |
| KR | 20180079150 A | 7/2018 |
| KR | 20180130436 A | 12/2018 |

OTHER PUBLICATIONS

English Translation of KR20140055563 (Year: 2014).*
2014.*
Li et al. "Ultrasound-assisted fabrication of metal nano-porous shells across polymer beads and their catalytic activity for reduction of 4-nitrophenol" Ultrasonics Sonochemistry 2018 49:63-68 (Year: 2018).*
Park et al. "Facile synthesis of tailored nanostructured ORMOSIL particles by a selective dissolution process" J. Colloid and Interface Science 2015 438:220-226 (Year: 2015).*
Spuch-Calvar et al. "Synthesis and Optical characterization of submicrometer gold nanotubes grown on goethite rods" Langmuir 2008 24:9675-9681 (Year: 2008).*

(Continued)

*Primary Examiner* — Changhwa J Cheu
(74) *Attorney, Agent, or Firm* — STIP Law Group, LLC

(57) ABSTRACT

Microparticles for detecting biological materials are provided. Each of the microparticles includes: a core-shell structured microparticle consisting of a core including a magnetically responsive metal and a shell layer surrounding the core and having a uniform thickness; and capture probes introduced onto the shell layer to capture biological materials.

19 Claims, 10 Drawing Sheets

(56) References Cited

OTHER PUBLICATIONS

Zhou (Applied Surface Science 2013 273:89-93). (Year: 2013).*
Fang et al. RSC Advances 2016 6:67875-67882 (Year: 2016).*
International Search Report of PCT/KR2019/013613, Jan. 23, 2020, English translation.
O. Y. Galkin et al, Modern magnetic immunoassay: Biophysical and biochemical aspects, Regulatory Mechanisms in Biosystems, Nov. 2017, pp. 47-55, vol. 9, No. 1, Oles Honchar Dnipro National University, Dnipropetrovsk Oblast, Ukraine.
Ji-Ching Lai et al, Multiplex Immunoassays Utilizing Differential Affinity Using Aptamers Generated by MARAS, Scientific Reports, Jul. 2017, pp. 1-10, vol. 7, No. 6397, Springer Nature, Berlin, Germany.

* cited by examiner

[Fig. 1]
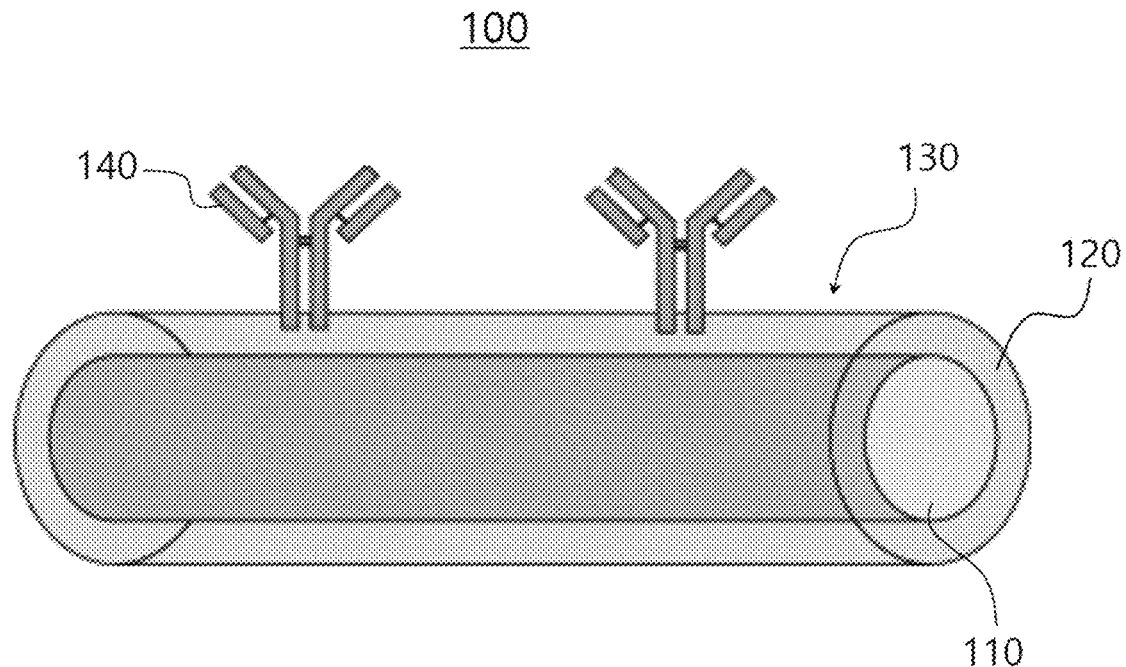
[Fig. 2]
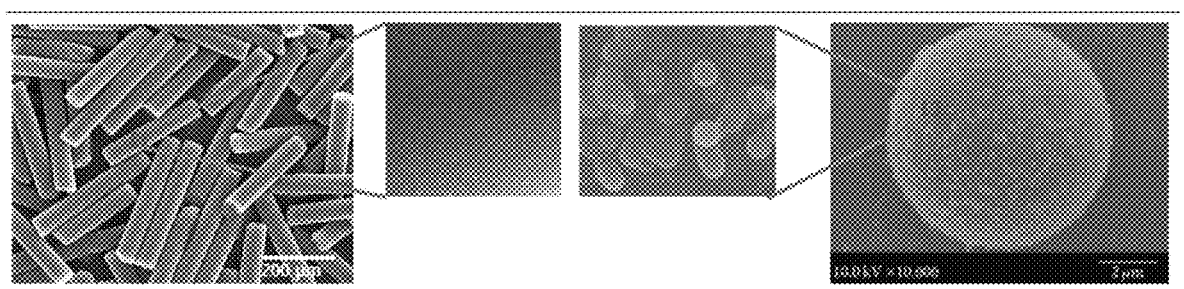

[Fig. 3]
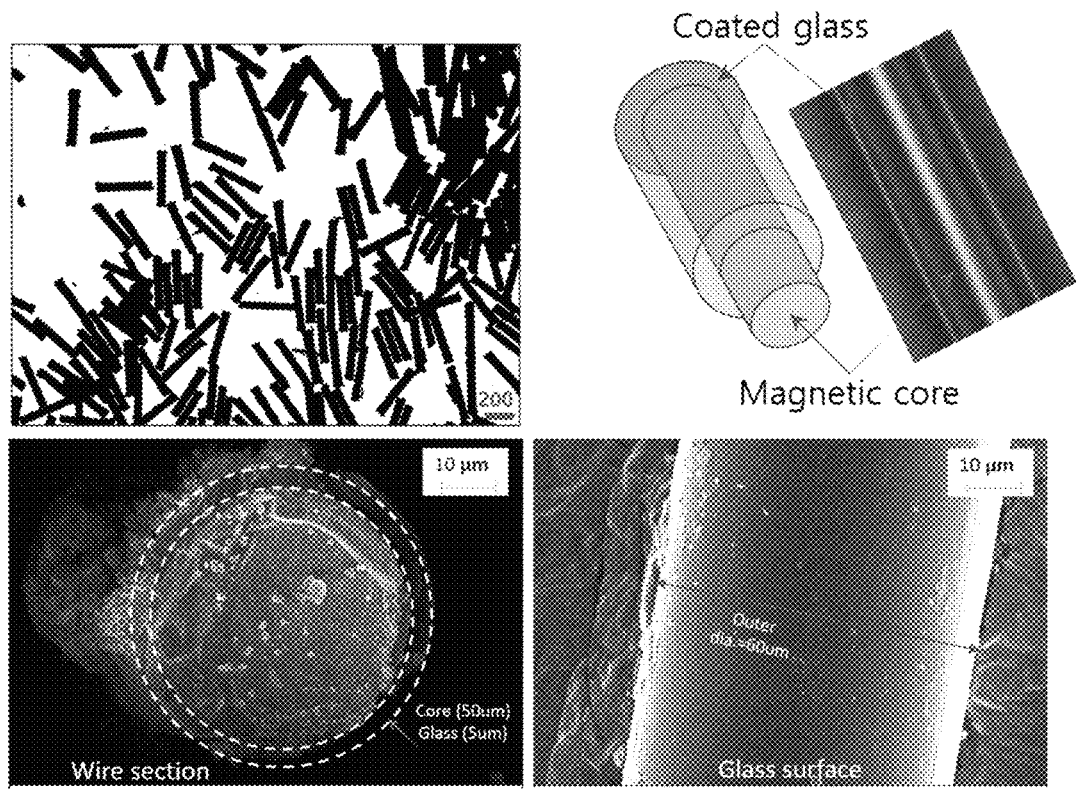

[Fig. 4]
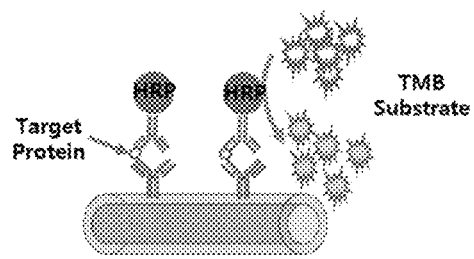
<Magnetic ELISA model>
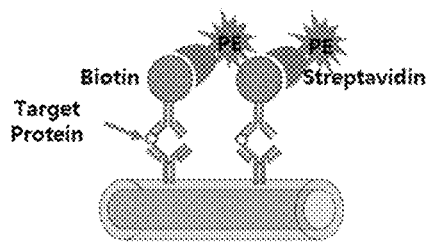
<Magnetic fluorescence image analysis model>
[Fig. 5]
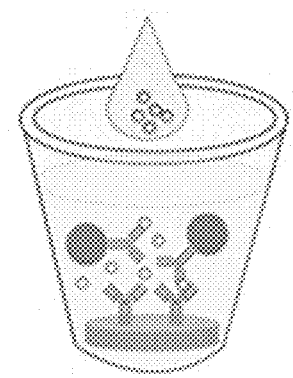
 : Phosphor-conjugate
 : Antigen
 : Antibody/magnetic rod

[Fig. 6]
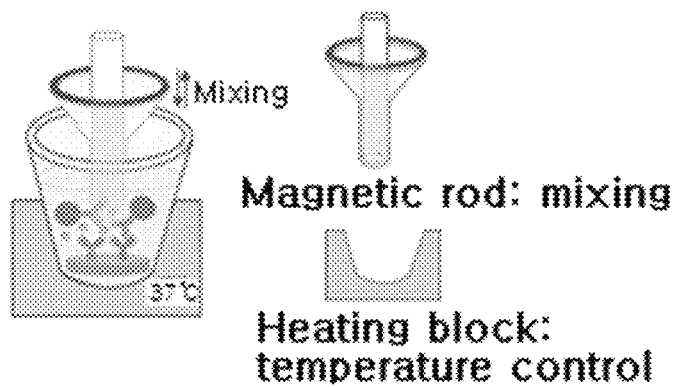
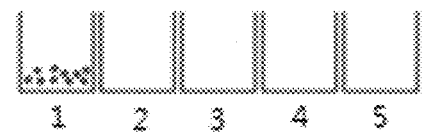
[Fig. 7]
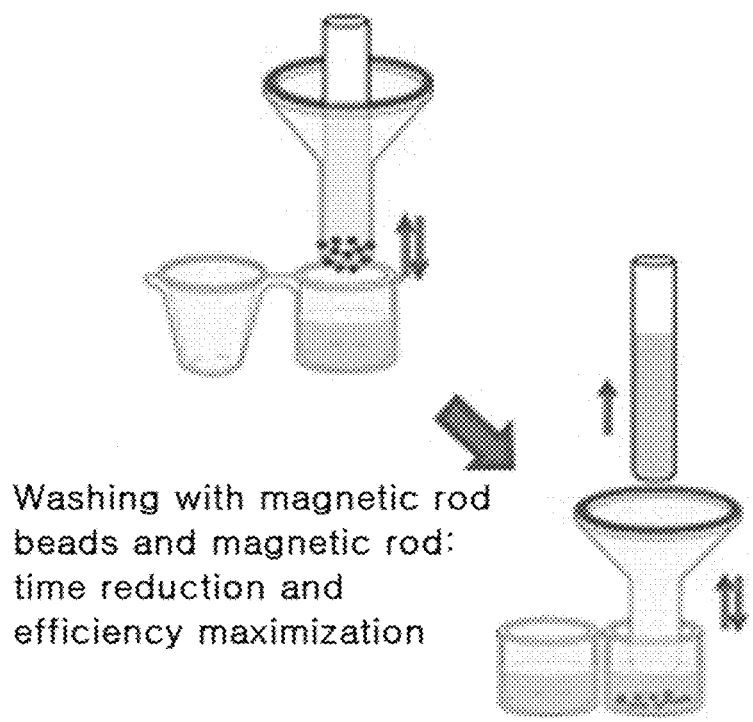
Washing with magnetic rod beads and magnetic rod: time reduction and efficiency maximization

[Fig. 8]
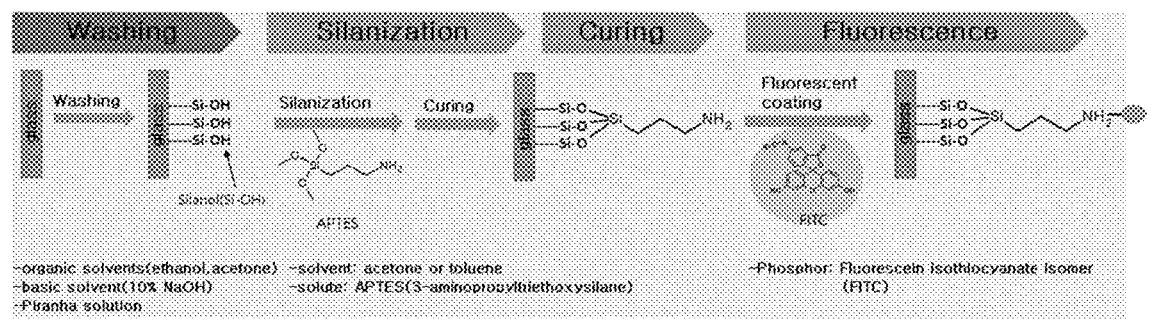
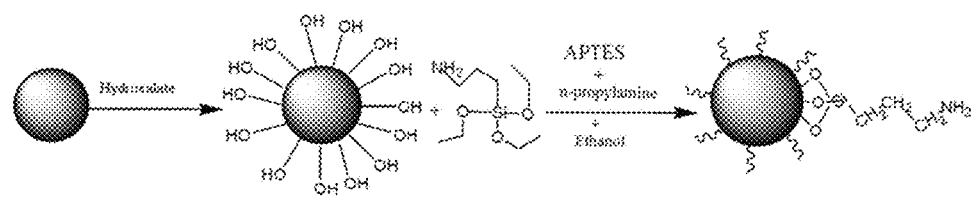
[Fig. 9]
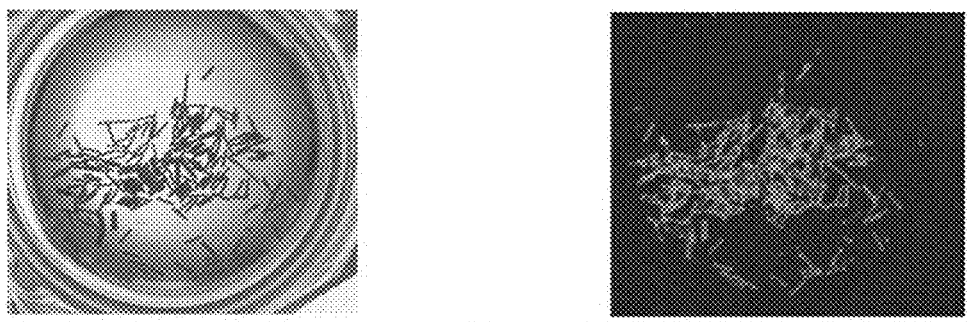
<Bright field image of rod-like magnetic beads on which antibodies were placed after surface treatment>   <Fluorescence image of rod-like magnetic beads on which antibodies were placed after surface treatment>

[Fig. 10]
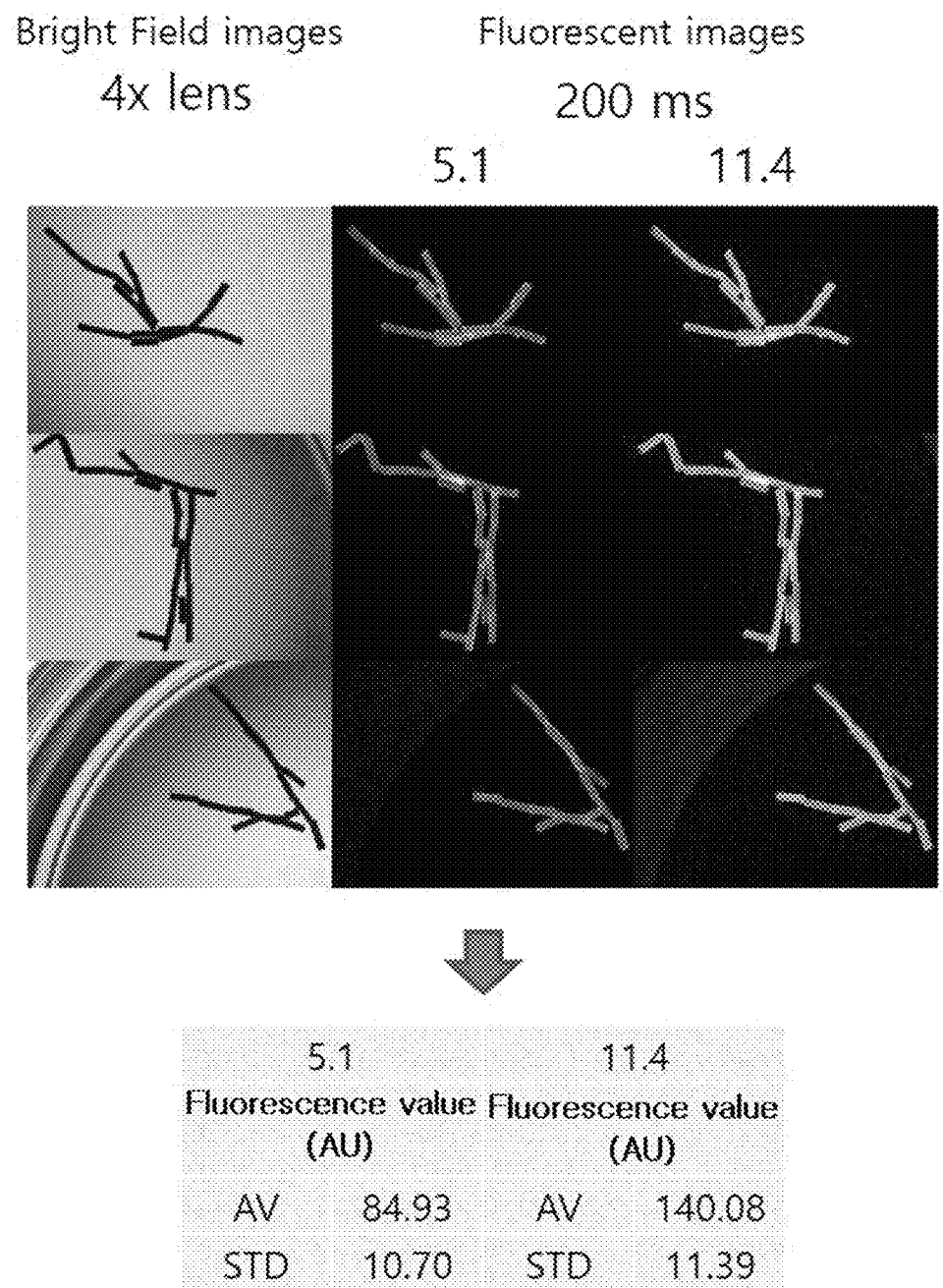

[Fig. 11]
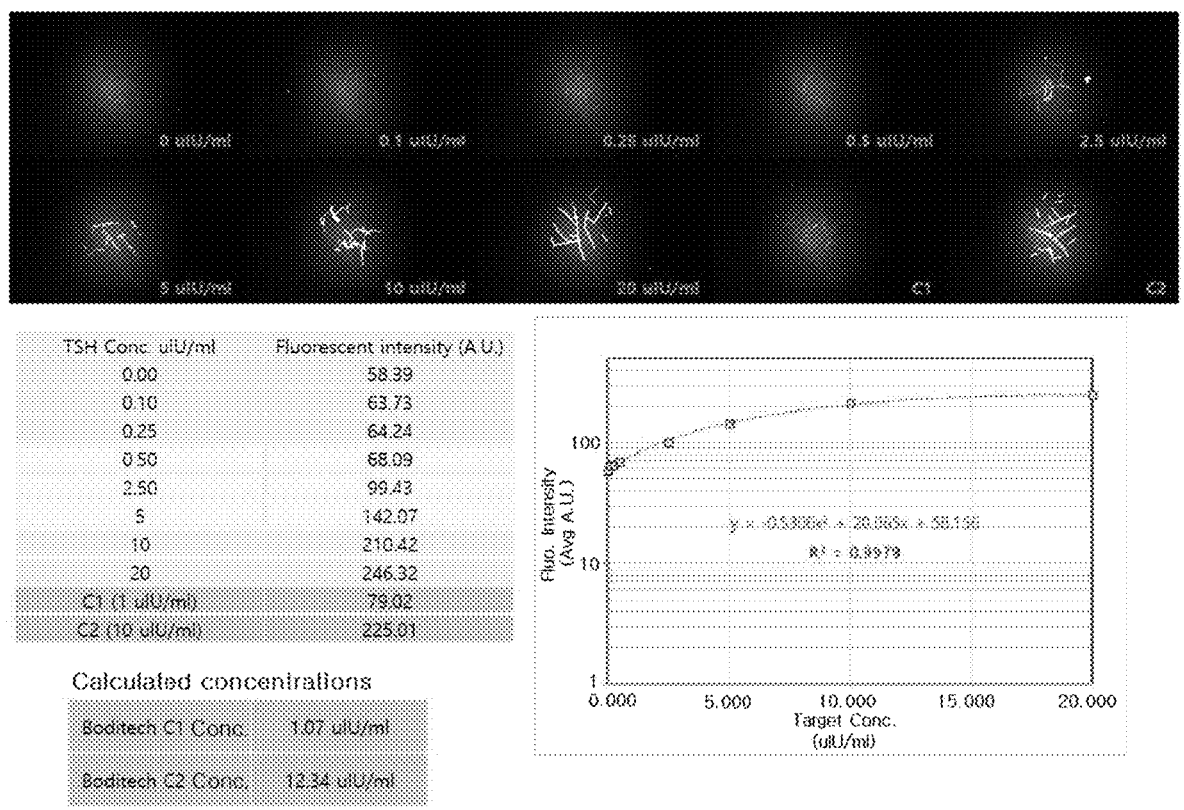

[Fig. 12]
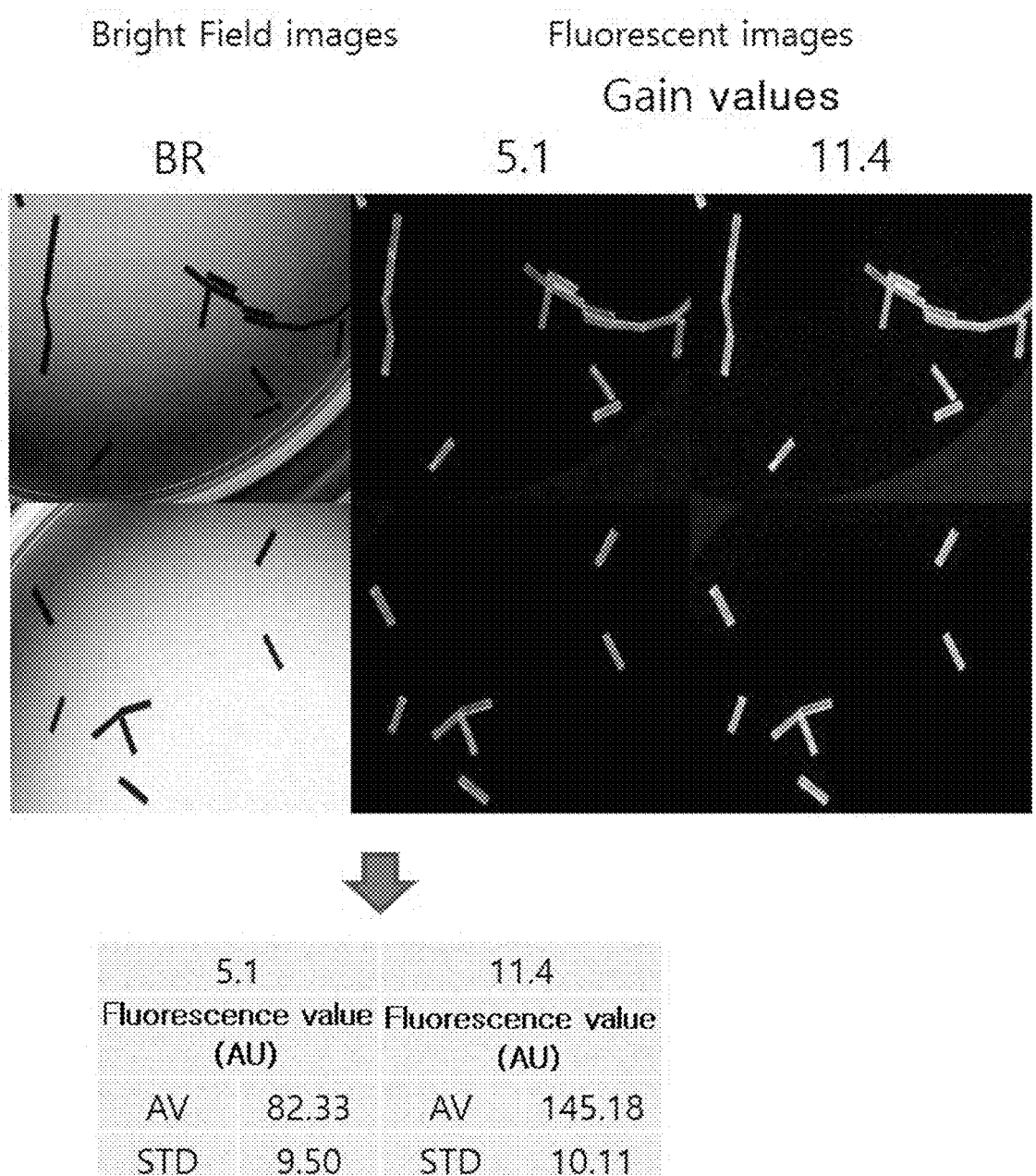

[Fig. 13]
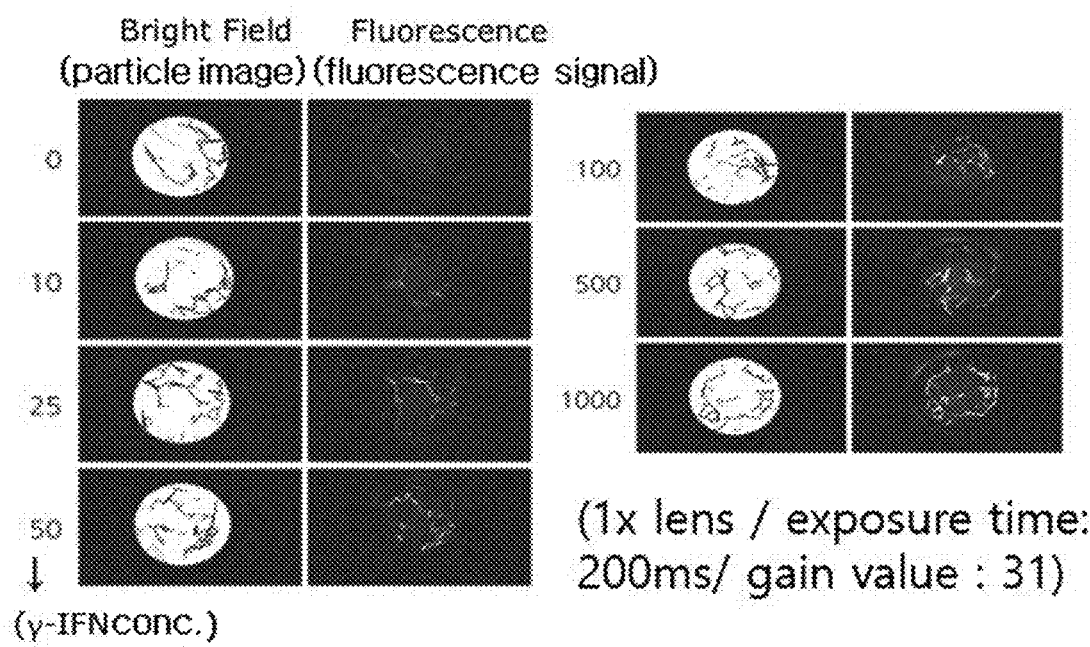
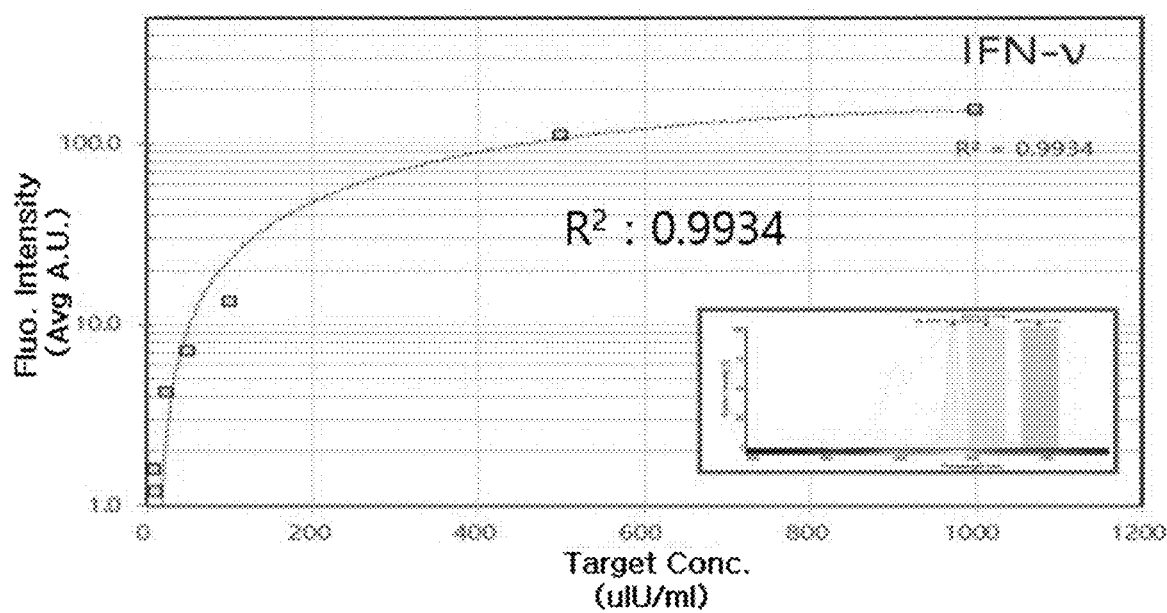

[Fig. 14]
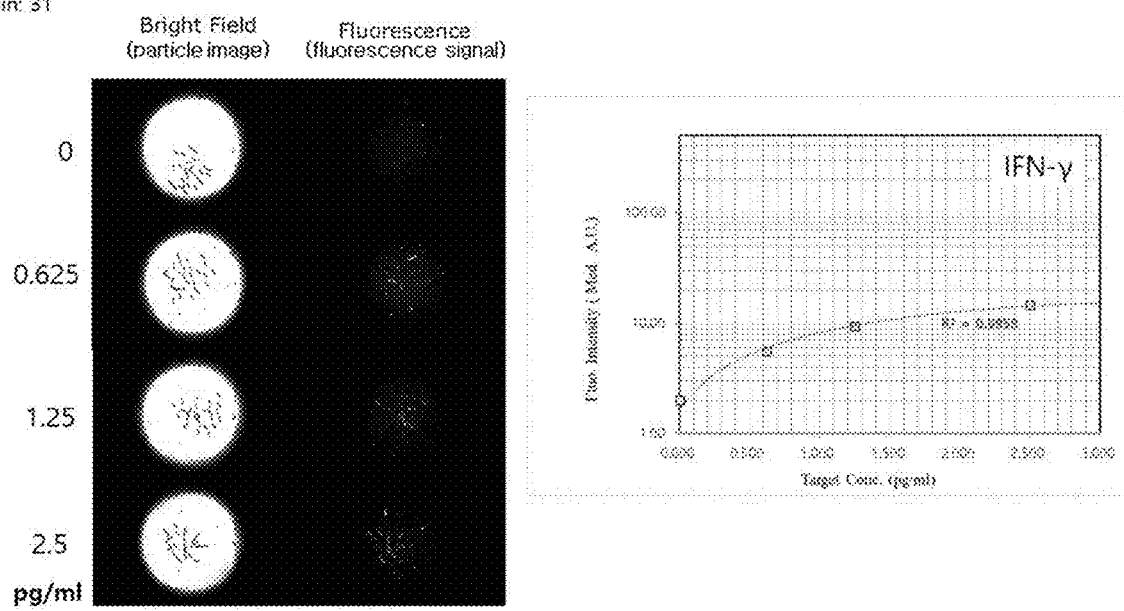
(1x lens / exposure time 300ms/ gain value 31)
[Fig. 15]
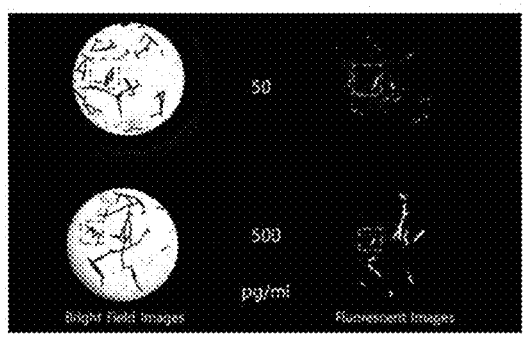
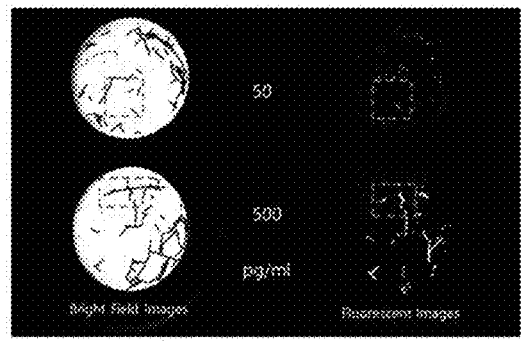

MICROPARTICLES FOR DETECTING BIOLOGICAL MATERIALS AND METHOD FOR DETECTING BIOLOGICAL MATERIALS USING THE SAME

CROSS-REFERENCE TO RELATED APPLICATIONS

This application is the U.S. National Phase under 35 U.S.C. § 371 of International Application No. PCT/KR2019/013613 filed on Oct. 16, 2019, which in turn claims the benefit of Korean Application No. 10-2018-0123484 filed on Oct. 17, 2018, the disclosures of which are incorporated by reference into the present application.

TECHNICAL FIELD

The present disclosure relates to microparticles for detecting biological materials and a method for detecting biological materials using the same. More specifically, the present disclosure relates to novel microparticles and a method for rapid multiplexed detection of biological materials of interest with high sensitivity at low cost based on immunodiagnostics.

BACKGROUND ART

In vitro diagnostics (IVD) is a technique for analyzing samples collected from humans (e.g., blood, urine, and cells) to diagnose human health. Such in vitro diagnostic methods include immunodiagnostics, self-blood glucose monitoring, and molecular diagnostics. Particularly, immunodiagnostic techniques can be used to diagnose and track a wide variety of diseases by determining the presence or absence of specific pathogenic proteins based on antigen-antibody reactions. However, the presence of target proteins at concentrations above the limits of detection is a prerequisite for the utilization of immunodiagnostic techniques. Due to this disadvantage, various techniques have been developed to amplify signals generated from low concentrations of proteins.

Particularly, with recent advances in synthetic chemistry and bioscience, various target analytes have appeared in a variety of fields, including new drug development and diagnostics. Several highly sensitive methods have been reported to detect minute amounts of targets using magnetic particles that ensure the generation of signals (Modern magnetic immunoassay: Biophysical and biochemical aspects (2017) Regul. Mech. Biosyst., 9(1), 47-55).

Conventional immunodiagnostic techniques use nanometer-sized magnetic particles surface modified with silica. However, such silica-modified magnetic particles are not effectively extracted or released from wells where immune reactions occur. That is, small-sized magnetic particles are often present in a suspended form in solutions and are thus difficult to separate. For this reason, small-sized magnetic particles are used for qualitative analysis rather than quantitative analysis. Further, conventional analytical methods require a long testing time and involve a complex test procedure because they can test only one magnetic particle at a time.

DETAILED DESCRIPTION OF THE INVENTION

Problems to be Solved by the Invention

One aspect of the present disclosure provides microparticles for detecting biological materials, each of which includes: a core-shell structured microparticle consisting of a core including a magnetically responsive metal and a shell layer surrounding the core and having a uniform thickness; and capture probes introduced onto the shell layer to capture biological materials.

A further aspect of the present disclosure provides a method for preparing microparticles for detecting biological materials, including: providing core-shell structured microparticles, each of which consists of a core including a magnetically responsive metal and a shell layer surrounding the core and having a uniform thickness; and introducing capture probes for capturing biological materials onto the shell layer.

Another aspect of the present disclosure provides a method for detecting biological materials, including: (a) providing the microparticles for detecting biological materials; (b) providing detection probes capable of specific binding to biological materials and conjugated with a luminescent material emitting light in response to an external stimulus; (c) allowing the capture probes, the biological materials, and the detection probes to react with one another to form complexes of the microparticles, the biological materials, and the detection probes; and (d) measuring luminescence signals emitted from the luminescent material present in the complexes in response to the external stimulus to detect the biological materials.

BRIEF DESCRIPTION OF THE DRAWINGS

FIG. 1 shows one embodiment of a microparticle for detecting biological materials.

FIG. 2 shows scanning electron microscopy images of the surfaces of a glass-coated microparticle according to one exemplary embodiment of the present disclosure (left) and a silica-coated magnetic particle prepared using TEOS according to the prior art (right).

FIG. 3 shows images of microrod-like microparticles for detecting biological materials according to one exemplary embodiment of the present disclosure.

FIG. 4 is a schematic diagram showing antigen-antibody reactions for detecting target proteins by ELISA (top) and fluorescence measurement (bottom).

FIG. 5 shows a reaction when target antigens are dropped onto immunoreactive materials, Specifically, FIG. 5 shows the structures and principles of action of capture antibody-bound microrods for immunodiagnosis, target antigens in a sample solution, and phosphor-conjugates in which phosphors are conjugated to detection antibodies.

FIG. 6 shows a process for mixing and heating with a magnetic rod and a heating block to promote immune reactions.

FIG. 7 shows a process for washing microrods and a magnetic rod to remove non-specific materials.

FIG. 8 is a schematic diagram showing an experiment to amino-silanize the surface of a microrod and to confirm the results of the amino-silanization by FITC.

FIG. 9 shows the uniformity and intensity (amount) of antibodies immobilized onto microrods. Specifically, FIG. 9 shows a bright field microscopy image (left) and a fluorescence microscopy image (right) after detection antibody-phosphor conjugates were bound to microrod complexes in which capture antibodies were immobilized on the surface of microrods.

FIG. 10 shows bright field microscopy images and fluorescence microscopy images taken after TSH antibodies were immobilized on the surface of magnetic particles.

FIG. 11 shows fluorescence intensities at different TSH concentrations.

FIG. 12 shows bright field microscopy images and fluorescence microscopy images taken after human γ-interferon antibodies were immobilized on the surface of magnetic particles.

FIG. 13 shows bright field microscopy images and fluorescence microscopy images at different γ-interferon concentrations, which were taken with a 1×lens for an exposure time of 200 ms, and the measured fluorescence intensities.

FIG. 14 shows bright field microscopy images and fluorescence microscopy images at different γ-interferon concentrations, which were taken with a 1×lens for an exposure time of 300 ms, and the measured fluorescence intensities.

FIG. 15 shows the results of an experiment to confirm whether IFN-γ and IL-10 cytokines immobilized onto magnetic particles could be used for multiplexed immunodiagnostics.

MODE FOR CARRYING OUT THE INVENTION

The present disclosure will now be described in detail with reference to the accompanying drawings. An element proceeded by "comprises . . . a" or "includes . . . a" does not preclude the existence of one or more additional elements, unless otherwise mentioned. The terms "on" and "over" are used to refer to the relative positioning and means the presence of another element or layer directly on the mentioned layer as well as the presence of one or more intervening layers or elements therebetween. Similarly to this, it will also be understood that the terms "under", "below", "lower", and "between" are used to refer to the relative positioning.

One aspect of the present disclosure provides microparticles for detecting biological materials. FIG. 1 shows one embodiment of a microparticle for detecting biological materials.

The microparticle 100 for detecting biological materials includes: a core-shell structured microparticle 130 consisting of a core 110 including a magnetically responsive metal and a shell layer 120 surrounding the core and having a uniform thickness; and capture probes 140 introduced onto the shell layer 120 to capture biological materials.

The magnetically responsive metal present in the core 110 of the core-shell structured microparticle 130 may be a paramagnetic material. For example, the magnetically responsive metal may be an iron (Fe), nickel (Ni), cobalt (Co) or manganese (Mn) alloy. The magnetically responsive metal may essentially include at least one transition metal such as iron, nickel, cobalt or manganese and may optionally include at least one rare earth metal such as gadolinium (Gd), terbium (Tb) or samarium (Sm). The magnetically responsive metal may optionally further include one or more other elements such as boron (B), silicon (Si), and carbon (C). The magnetically responsive metal is typically an iron alloy or a cobalt alloy. Specifically, the iron alloy is $Fe_{70}B_{15}Si_{10}C_5$ and the cobalt alloy is $Co_{68}Mn_7Si_{10}B_{15}$.

Preferably, the core-shell structured microparticle 130 has a size and specific gravity such that it is not suspended in water. Due to these physical properties, the core-shell structured microparticle 130 can be quickly collected or separated by an external magnet such as a permanent magnet or electromagnet. The core 110 may occupy 60% or more of the total volume of the core-shell structured microparticle 130. For example, the core 110 may occupy 60 to 99%, preferably 75 to 99%, of the total volume of the core-shell structured microparticle 130. Preferably, the core-shell structured microparticle 130 has a size (e.g., a diameter or length) of about several tens to several hundreds of micrometers (μm) and a specific gravity of at least 5 (5 or more). If the core-shell structured microparticle 130 has a size of less than 1 micrometer, it may be suspended in water despite its high specific gravity (for example, 7.876 for an iron nanoparticle). In this case, during a bioassay for detecting biological materials in a well using the core-shell structured microparticle 130 under the influence of an applied magnetic field, the biological materials are difficult to separate because the low magnetism of the microparticle makes control over the magnetic properties of the microparticle difficult. When a magnetic rod is moved up and down in wells to promote immune reactions, microparticles are attached and detached to and from the magnetic rod. Even after the magnetic field is removed, the microparticles attached to the magnetic rod do not fall off on the well bottom and remain non-specifically bound to the magnetic rod during upward and downward movement of the magnetic rod due to their small weight, causing poor reproducibility of quantitative analysis when biological materials present in the wells are detected.

According to one embodiment of the present disclosure, the microparticles are much larger in size than silica beads used for bioassays in the art. The magnetically responsive metal (magnetic core) takes up most of the volume of the microparticles, unlike existing silica beads containing magnetic particles therein. Thus, the magnetically responsive metal is sensitive to magnetism, ensuring high reproducibility of quantitative analysis.

The microparticle 100 has a core-shell structure in which the central magnetically responsive metal is surrounded by the shell layer 120. The shell layer 120 is formed using an organic or inorganic material, preferably glass. The capture probes immobilized on the surface of the shell layer are antibodies or proteins. For immobilization of the capture probes, functional groups such as hydroxyl, amino or carboxyl groups may be introduced on the surface of the shell layer.

The shell layer 120 may substantially completely surround the core-shell structured microparticle 130. Alternatively, the surface of the core-shell structured microparticle 130 may not be completely covered with the shell layer and may be partially exposed during production of the microparticle.

The thickness of the shell layer 120 may be 1 to 100 μm, preferably 1 to 50 μm, more preferably 1 to 10 μm, and even more preferably 4 to 8 μm. If the thickness of the shell layer 120 is less than the lower limit, the surface of the shell layer 120 tends to be brittle or is apt to crack. Meanwhile, if the thickness of the shell layer 120 exceeds the upper limit, problems may be caused by the characteristics and wavelength of a laser during glass cutting.

The core-shell structure may be formed by applying a liquid shell component to the core metal or filling the core metal component in a hollow frame.

The shell layer 120 may be formed by solidification of an organic or inorganic coating solution. More specifically, the shell layer 120 may be formed by melting an organic or inorganic shell component at a high temperature to make the shell component flowable. Alternatively, the shell layer 120 may be formed by dissolving a shell component in a solvent to prepare a coating liquid and applying the coating liquid to the core metal. The organic material is usually a polymer and the inorganic material may be a metal or a ceramic material, especially glass. For example, the shell layer 120 may be formed by dissolving a plastic material in a solvent or melting glass to obtain a coating solution and applying the coating solution to the core-shell structured microparticle 130 by a suitable coating process such as dip coating or spray coating.

A glass tube may be used as the hollow frame. In this case, after a metal powder is put into the glass tube, the glass tube is drawn while melting the metal powder at high temperature. Alternatively, a molten metal may be injected into the glass tube while drawing the glass material. Alternatively, a dispersion of a metal powder in a UV curable material may be filled in a glass tube and cured by irradiation with ultraviolet light. In these approaches, the hollow frame may constitute the shell layer.

The surface of the core-shell structured microparticle 130 is very uniform. In the case of particles for bioassay, a shell layer is formed by growing a silica precursor such as TEOS on the surface of core particles. In this case, the shell layer has a very rough surface, and as a result, most of the particles bind non-specifically to target materials. This non-specific binding may cause unnecessary background noise.

Glass (for example, borosilicate glass) for the shell layer 120 exhibits little non-specific binding caused by adsorption with a reaction sample through a chemical reaction. Particularly, the surface of the core-shell structured microparticle 130 is very uniform because the shell layer 120 has a coating layer derived from a liquid component. The average surface roughness ($R_a$) of the shell layer 120 may be 15 nm or less, preferably 10 nm or less, more preferably 5 nm or less, more preferably 2 nm or less, particularly 1.5 nm or less. The $R_a$ may be, for example, 3 nm or more, 2 nm or more or 1 nm or more. Within this range, non-specific adsorption of a reaction sample to the surface of the shell layer 120 can be minimized.

FIG. 2 shows scanning electron microscopy images of the surfaces of a glass-coated microparticle according to one exemplary embodiment of the present disclosure (left) and a silica-coated magnetic particle prepared using TEOS according to the prior art (right). Referring to FIG. 2, the surface uniformity of the glass-coated microparticles was high compared to that of the prior art silica-coated magnetic particles.

The shell layer of the core-shell structured microparticles 130 is preferably made of glass taking into consideration its strength and transparency. The glass may be composed essentially of at least one compound selected from the group consisting of soda lime, borosilicate, aluminosilicate, silica, alkali silicate, Pyrex, and quartz. Preferably, the glass is borosilicate glass, which is suitable for experiments where heat resistance, acid resistance, and water resistance are required.

The core-shell structured microparticles 130 may be in an unshaped or shaped form. When shaped, the core-shell structured microparticles 130 are in the form of rods, sheets or spheres. The sheet-like microparticles 130 may have various cross-sectional shapes such as stars, polygons, and circles but are not particularly limited thereto. The microparticles are in the form of microrods, microdiscs or nicrobeads, which are preferable in terms of convenience of production and ease of observation. The microparticles are particularly preferably in the form of microrods. The core-shell structured microparticles 130 in the form of microrods are easy to distinguish from each other due to their overlap. When placed in wells, the core-shell structured microparticles 130 in the form of microrods are easy to focus on. Since the individual microparticles 130 in the form of microrods occupy small areas, a large number of the microparticles can be displayed on a single screen. The microparticles may have complex cross-sectional shapes such as stars. In this case, however, the microparticles tend to collide with each other or with the walls of the wells while moving in the wells, causing breakage at the edges. Therefore, it is advantageous that the microparticles have simple shapes such as microrods.

The microrods may have a length of 10 to 1,000 µm. If the microrods have different lengths less than the lower limit, the microrods are not easy to distinguish from each other. Meanwhile, if the length of the microrods exceeds the upper limit, the particles may overlap, making their observation difficult. The ratio of the length to the diameter of the microrods (i.e. aspect ratio) may be at least 2 (2 or more), at least 5 (5 or more) or at least 10 (10 or more). If the aspect ratio is less than the lower limit, the microrods are close to spherical microparticles, making it difficult to distinguish from each other. Meanwhile, if the aspect ratio exceeds the upper limit, the microrods are liable to bend.

In a preferred embodiment, the core-shell structured microparticles 130 may be obtained by cutting glass-coated metal microwires. In this embodiment, the glass-coated metal microwires are simply cut to different lengths by a laser.

The core-shell structured microparticles 130 can be suitably used for in vitro diagnostics for detecting biological materials in sample solutions derived from living organisms. The sample solutions may be tissue extracts, cell lysates, whole blood, plasma, serum, saliva, ocular humor, cerebrospinal fluid, sweat, urine, milk, ascites fluid, synovial fluid, and peritoneal fluid. For rapid diagnosis, the pretreatment of the sample solutions may be simplified or may be even omitted.

The biological materials may be biomarkers, blood, plasma, serum, body fluids, proteins, peptides, nucleic acids, bacteria, viruses, endoplasmic reticula, miRNAs, exosomes, and circulatory tumor cells. Preferably, the biological materials are biomarkers. In particular, the microparticles of the present disclosure are very useful for biomarker detection due to their ability to detect various types of biological materials in a single test to rapidly diagnose diseases. The biomarkers are not limited as long as they are used in general scientific or medical applications for the measurement or evaluation of biological treatment, pathogenesis, and pharmacological treatment processes. The biomarkers may be, for example, polypeptides, peptides, nucleic acids, proteins or metabolites that can be detected in biological fluids such as blood, saliva, and urine. Specifically, the biomarkers can be selected from the group consisting of thyroid-stimulating hormone (TSH), free T4, diabetes specific antigen (HbA1c), prostate-specific antigen (PSA), cervical cancer markers, and breast cancer markers.

In one embodiment of the present disclosure, the capture probes 140 may be introduced onto the shell layer 120 to capture the biological materials in the sample solutions. The capture probes 140 allow the biological materials to be captured by the core-shell structured microparticles 130 due to their ability to specifically bind to the biological materials. The capture probes 140 may be antibodies, proteins, nucleic acids or aptamers. For example, the capture probes may be capture antibodies capable of specific binding to capture the biomarkers. The capture probes 140 may be immobilized on the surface of the core-shell structured microparticles 130 by adsorption or chemical bonding. Preferably, the capture probes 140 are linked to surface functional groups of the shell layer 120. For example, the capture probes 140 may be attached to the core-shell structured microparticles 130 by introducing biotin on the surface of the capture probes 140 and introducing avidin, neutravidin or streptavidin capable of binding to biotin onto the core-shell structured microparticles 130. Alternatively, the capture probes 140 may be linked to the core-shell structured microparticles 130 via hydroxyl, amino or carboxyl groups on the surface of the core-shell structured microparticles 130.

The use of the microparticles enables rapid analysis of desired biological materials in sample solutions with high sensitivity. FIG. 3 shows images of microrod-like microparticles for detecting biological materials according to one exemplary embodiment of the present disclosure.

A further aspect of the present disclosure provides a method for preparing microparticles for detecting biological materials.

According to one embodiment of the present disclosure, the method includes: (a) providing core-shell structured microparticles, each of which consists of a core including a magnetically responsive metal and a shell layer surrounding the core and having a uniform thickness, and (b) introducing capture probes for capturing biological materials onto the shell layer. In one embodiment, the microparticles may be microrods whose surface is coated with glass. For introduction of the capture probes, the surface of the microparticles may be appropriately modified. For example, i) the microrods surface coated with glass are modified with Si—OH (silanol) by sequentially washing with an organic solvent, a basic solution, and a piranha solution. Next, ii) the surface Si—OH is amino-silanized through silanization and curing. The silanization is performed by treating with a solution of 3-aminopropyltriethoxysilane (APTES) in acetone or toluene as a solvent. Thereafter, the surface of the microrods may also be modified by reacting with gamma-butyrolactone or succinic anhydride to replace the amino groups with carboxyl groups.

Another aspect of the present disclosure provides a method for detecting biological materials, including: a) providing the microparticles for detecting biological materials; b) providing detection probes capable of specific binding to biological materials and conjugated with a luminescent material emitting light in response to an external stimulus; c) allowing the capture probes, the biological materials, and the detection probes to react with one another to form complexes of the microparticles, the biological materials, and the detection probes; and d) measuring luminescence signals emitted from the luminescent material present in the complexes in response to the external stimulus to detect the biological materials.

Like the capture probes, the detection probes may be antibodies, proteins, nucleic acids or aptamers capable of specific binding to the biological materials. For example, the detection probes may be detection antibodies that specifically bind to biomarkers and contain a luminescent material.

The detection antibodies and the capture antibodies may be antibodies against antigens used in general immunodiagnostics. For example, the antigens may be thyroid-stimulating hormone (TSH), free T4, diabetes specific antigen (HbA1c), prostate-specific antigen (PSA), cervical cancer antigens, and breast cancer antigens.

The luminescent material is bound to the detection probes and generates light in response to an external stimulus to detect the presence of the biological materials. The external stimulus is selected from ultraviolet light, electron beams, chemical reactions, and enzyme-substrate reactions. Examples of suitable luminescent materials include fluorescent molecules, quantum dots, metal nanoparticles, magnetic nanoparticles, enzymes, and enzyme substrates. Particularly, fluorescent molecules are preferred because of their ease of purchase and convenience of application. The fluorescent molecules can be selected from the group consisting of fluorescein isothiocyanate (FITC), fluorescein, fluorescein amidite (FAM), phycoerythrin (PE), tetramethylrhodamine isothiocyanate (TRITC), cyanine 3 (Cy3), cyanine 5 (Cy5), cyanine 7 (Cy7), Alexa Fluor dyes, and rhodamine.

The method for detecting biological materials may be carried out by an immunodiagnostic assay. The complexes of the microparticles, the biological materials, and the detection probes can be prepared by mixing the microparticles immobilized with the capture antibodies, the detection antibodies specifically binding to the biological materials, and a sample solution containing the biological materials in a reaction tube. The complexes can be prepared by simultaneously inducing first immune reactions between the biological materials and the microparticles and second immune reactions between the biological materials and the detection antibodies in the reaction tube.

The formation of the complexes may include promoting the reactions in the presence of an external magnetic force. For example, the immune reactions may be promoted by heating the reaction tube on a heating block to an appropriate temperature and allowing a magnetic rod to continuously move up and down in the reaction tube to rapidly mix the immunoreactive materials.

The method for detecting biological materials may further include washing the complexes in the presence of an external magnetic force. That is, the method may further include continuously washing the complexes of the microparticles, the biological materials, and the detection probes and the magnetic rod in two or more washing tubes after completion of the first and second immune reactions. After the washing, luminescence signals from the complexes are detected to accurately identify the types and amounts of the biological materials.

The luminescence signals can be detected by a suitable technique, for example, ELISA or fluorescence measurement.

FIG. 4 is a schematic diagram showing antigen-antibody reactions for detecting target proteins by ELISA (top) and fluorescence measurement (bottom).

More specifically, the ELISA technique is carried out by binding the target materials in the sample to the capture antibodies immobilized onto the magnetic macroparticles and treating the detection antibodies. The detection antibodies bind to the opposite sides to the sides of the target materials to which the capture antibodies are bound. An enzyme called horseradish peroxidase (HRP) is conjugated to the detection antibodies. The enzyme uses hydrogen peroxide to degrade TMB substrate, giving a color. The chromaticity of the color is determined by the OD value. That is, the method is based on the principle that quantitatively large numbers of the capture antibodies and the detection antibodies are attached in proportion to the amounts of the target materials in the sample, and as a result, the amount of HRP conjugated to the detection antibodies increases, so that the enzymatic reactions proceed relatively rapidly, causing a rapid change in the color of TMB substrate. The amounts of the target materials in the sample can be determined by previously treating with various concentrations of the target materials to obtain OD values, drawing a standard curve from the OD values, treating with the actual sample to obtain OD values, and comparing the actual OD values with the standard curve. At this time, all OD values and concentrations can be calculated with the automatic analysis program of the analyzer.

The fluorescence measurement technique is based on the same principle as the ELISA technique in that the capture antibodies and the detection antibodies are used for sandwich assay, except that biotin is conjugated to the detection antibodies instead of HRP enzyme and is treated with a streptavidin-conjugated fluorescent material to measure fluorescence values. First, TSH protein reacts with and is attached to the capture antibodies, followed by treatment with the detection antibodies conjugated with biotin to attach the detection antibodies to the opposite sides to the sides of the TSH to which the capture antibodies are attached. Thereafter, after treatment with e-flour as the fluorescent material conjugated with streptavidin, fluorescent signals from the microparticles are measured. Based on the principle that higher concentrations of the target diagnostic markers lead to stronger fluorescence signals from the magnetic particles, the locations of the microparticles in the reaction wells are identified with a bright field microscope, and fluorescence signals from the corresponding locations are measured in pixels, and images of fluorescence signals from about 10 microparticles are automatically analyzed. Fluorescence values are measured in the same manner after reaction with various concentrations of the target materials, a standard curve is drawn from the measured fluorescence values, and fluorescence values from the test detection are applied to the standard curve to calculate the concentrations of the corresponding target proteins in the final sample. All images are analyzed and all fluorescence values are calculated with the automatic analysis program of the analyzer. FIG. 5 shows the results of fluorescence analysis using the microparticles at different TSH concentrations. In FIG. 5, (a) shows bright field microscopy images and fluorescence microscopy images at different concentrations, (b) is a table showing fluorescence values (medium) and fluorescence CV values (%) measured using 10 microparticles at different TSH concentrations, and (c) shows fluorescence values at different TSH concentrations. Referring to FIG. 5, the fluorescence intensity increases with increasing TSH concentration.

One embodiment of the method for detecting biological materials using microrods as the microparticles will be more specifically described based on the respective steps.

Step 1: Preparation and Surface Treatment of Microrods

Microrods as the microparticles for detecting biological materials are obtained by producing glass-coated microwires in accordance with the disclosure of Korean Patent Publication No. 10-2018-0130436, which was filed by the present inventor, and cutting the microwires to an appropriate size. For example, the microwires are cut to a length of 100 to 500 μm, the diameter of the metal core is 50 μm, and the thickness of the glass coating surrounding the core is 5 μm. Accordingly, the resulting microrods have a diameter of 60 μm and a length of 100 to 500 μm.

Capture antibodies capable of binding to target antigens are bound to the microrods. To this end, the glass surface of the microrods is appropriately modified. The surface modification can be performed by substitution with amino or carboxyl groups. For substitution with amino groups, the surface glass of the rods can be modified with Si—OH (silanol). Thereafter, the glass surface can be modified with amino-silane through silanization and curing.

The capture antibodies may be immobilized onto the microrods surface-modified with amino-silane. Preferably, the microrods are substituted with carboxyl groups for immobilization with the capture antibodies. Approximately 10,000 microrods can be treated in a 1.5 ml E-tube. For effective substitution with carboxyl groups, gamma-butyrolactone or succinic anhydride, preferably gamma-butyrolactone, is used. More details are provided in the following examples.

Step 2: Preparation of Microrod Complexes Immobilized with the Capture Antibodies The capture antibodies specifically binding target biomarker antigens in a sample solution are immobilized onto the surface-modified microrods (preferably the microrods modified with carboxyl groups) to prepare microrod complexes. The desired antibodies can be non-specifically bound to the glass coating of the microrods. The capture antibodies refer to antibodies that specifically bind to target antigens in a sample solution.

Step 3: Preparation of Immunoreactive Materials

Detection antibody-fluorescent material conjugates specifically binding to antigens in a sample solution are prepared. When it is intended to detect a plurality of marker antigens in a sample solution, the microrods having different shapes (e.g., different lengths) are used. The capture antibodies immobilized onto the microrods specifically bind to and capture specific makers in a sample solution.

An enzyme may be used instead of the fluorescent material.

Step 4: Sample Dropping

A sample solution containing target materials (targets) is dropped into a reaction tube containing the microrod complexes immobilized with the capture antibodies specifically binding to antigens as biomarkers and the detection antibody-fluorescent material conjugates specifically binding to antigens. When antigens as biomarkers are present in the sample solution, first immune reactions with the microrods and second immune reactions with the detection antibodies will be induced.

FIG. 5 shows a reaction when the target antigens are dropped onto the immunoreactive materials, Specifically, FIG. 5 shows the structures and principles of action of the capture antibody-bound microrods for immunodiagnosis, the target antigens in the sample solution, and the phosphor-conjugates in which the phosphors are conjugated to the detection antibodies.

Step 5: Mixing/Heating

The reaction tube is placed on a heating block and heated to an appropriately controlled temperature. General immune reactions take place actively at about 35° C. The immunoreactive materials are mixed rapidly while a magnetic rod continuously moves up and down in the reaction tube. This mixing shortens the immune reaction time.

FIG. 6 shows a process for mixing and heating with the magnetic rod and the heating block to promote immune reactions.

Step 6: Washing

After completion of the reactions, the microrods and the magnetic rod are washed successively in two or more washing tubes and the reaction solution is diluted to an appropriate concentration. The washing removes non-specific materials and enables washing/recovery of the microrods.

FIG. 7 shows a process for washing the microrods and the magnetic rod to remove non-specific materials.

Step 7: Measurement of Detection Signals

After completion of the reactions, code recognition is performed through image analysis to measure detection signals. Multi-detection is enabled with only one fluorescent material. Detection signals can be measured by detecting fluorescent signals from the fluorescent material conjugated to the detection antibodies. When an enzyme is bound to the detection antibodies, detection signals can be measured by detecting colors developed by enzyme-substrate reactions, as in the ELISA technique. It takes approximately 30 minutes to carry out all of the above steps and the limit of detection is approximately several pg/ml to 10,000 pg/ml.

The method is intended for multiplexed detection of two or more types of biological materials using two or more types of microparticles. The microparticles may be labeled with different codes such as length, diameter, thickness, shape, color or identification codes so as to be distinguished from each other. The multiplexed detection may include reading the microparticles labeled by different codes. For example, the sample solution may contain a plurality of antigens and the microparticles may have a plurality of shapes whose number corresponds to that of the antigens. In this case, antibodies specifically binding to and capturing specific target antigens present in the sample solution are immobilized onto the microparticles having different shapes. This enables simultaneous detection of a plurality of targets. For example, microrods having different lengths may be used as the microparticles for multiplexed detection.

It is preferable that the temperature control of the heating block, the mixing and washing of the microparticle-biological material-detection probe complexes, and the washing of the magnetic rod are performed in an automated manner. The controlled reaction time and temperature allow the immune reactions to occur sufficiently, with the result that the formation rate of complexes can be maximized, achieving highly sensitive analysis.

Bioassays using the microparticles have the following advantages. The use of the microparticles including the shell layer whose surface is very uniform can prevent non-specific binding of targets, achieving low noise and maximum signal amplification. In addition, a magnetic force can largely act on the microparticles having a size of tens to hundreds of micrometers rather than nanometer-scale particles. The microparticles tend to aggregate without being suspended in an aqueous solution and can thus be easily controlled by a magnetic force.

Furthermore, the immune reactions can be promoted by mixing with the magnetic rod and heating with the heating block during bioassays using the microparticles, contributing to a significant reduction in reaction time. The microparticles can be quickly separated from the magnetic rod, and then the microparticles and the magnetic rod can be washed. Thus, targets can be detected with a precision comparable to that of ELISA and the test time can be shortened to less than 30 minutes.

Particularly, the microparticles can be produced on a large scale and strong fluorescence can be emitted in three dimensions. In addition, the microparticles can be easily produced to have various lengths, shapes or colors so as to be distinguishable from each other, thus being suitable for multiplexed detection. For example, when microrods produced by cutting glass-coated microwires to various lengths are used as the microparticles, multiplexed detection is enabled with only one fluorescent material. When the microparticles coded with length information are analyzed through image analysis, multi-detection is enabled at a time while maintaining highly sensitive accuracy.

Due the presence of the metal core therein, the microparticles appear very dark when observed under a bright field microscope and the contrast between the particles and the background is distinct, making it possible to clearly distinguish the particles from each other. The microparticles can be clearly observed by fluorescence imaging due to their large size. Since the microparticles have a size of tens to hundreds of micrometers, which is larger than the size of particles used in conventional bioassays, a lens with a low magnification, for example, a magnification of 1×, can be used to observe the microparticles in one well. Therefore, the microparticles can be observed over a very large area, enabling rapid analysis. In addition, since the focal length for the microparticles is large, the microparticles are less sensitive to the error of the Z-axis stage required for imaging, facilitating image focusing.

The present disclosure will be more specifically explained with reference to the following examples. It will be obvious to those skilled in the art that these examples are merely for illustrative purposes and the scope of the disclosure is not to be construed as being limited thereto.

EXAMPLES

Example 1. Preparation of Microrods

Microrods were prepared from glass-coated microwires produced by the method described in Korean Patent Publication No. 10-2018-0130436. First, the microwires were cut to sizes of 100-500 Each of the microrods had a magnetic metal core and a glass coating surrounding the core. The magnetic metal core had a diameter of 50 μm and the glass coating had a thickness of 5 μm. That is, the microrod had an outer diameter of 60 μm and a length of 100 to 500 μm.

Example 2. Surface Treatment of the Microrods

The glass surface of the microrods was appropriately modified. The surface modification was performed by substitution with amino or carboxyl groups.

2-1. Modification with Amino-Silane

First, amino groups were bound to the glass surface of the microrods for surface treatment. Specifically, the surface glass of the microrods was modified with silanol (Si—OH) by sequentially washing with organic solvents such as ethanol and acetone, a basic solution containing 10% NaOH, and a piranha solution. The glass surface was again modified with amino-silane by silanization using acetone or toluene as a solvent and 3-aminopropyltriethoxysilane (APTES) as a solute, followed by curing.

Finally, the amino-silane was coated with fluorescein isothiocyanate isomer (FITC) and fluorescence was measured to determine the uniformity and degree of the amino-silane modification. FIG. 8 is a schematic diagram showing the experiment to amino-silanize the surface of the microrod and to confirm the results of the amino-silanization by FITC.

2-2. Substitution with Carboxyl Groups

The amino groups of the microrods whose surface was amino-silanized were substituted with COOH. The COOH-substituted microrods are referred to as carboxyl beads. 10,000 microrods (500×75 μm) can be treated in a 1.5 ml E-tube. The following two approaches were used for substitution with COOH.

2-2-1. Use of γ-Butyrolactone

This approach is judged to be more effective than the other approach (2-2-2). Specifically, the following materials were used: amine MicroDisk, (amine free) dimethylformamide (DMF), γ-butyrolactone:DMF (60 μl:1 ml), triethylamine (TEA), ultrapure deionized water (DW)

The approach was performed by the following procedure:
1. Wash the microrods 2-3 times with 99% ethanol.
2. Bake at 95° C. for >5 min to completely remove the ethanol.
3. Wash once with DMF.

4. Mix γ-butyrolactone and DMF (60 μl:1 ml) in a 15 ml tube.
5. Add the following composition to the tube:
   γ-butyrolactone:DMF (60 μl:1 ml) 100 μl
   triethylamine (TEA) 8 μl;
   DMF (free) 500 μl;
   Total 608 μl
6. React at room temperature for 2 h while inverting the tube up and down (or with shaking at 900 rpm for 2 h).
7. Wash with 1) DMF (1 ml, 2×), 2) ethanol (1 ml, 2×), and 3) DW (1 ml, 2×) in this order.
8. Repeat 3-7 once.
9. Remove DW and store in IVIES buffer (0.1 M IVIES pH 5.0, Thermo Fisher Scientific, 28390) or PBS buffer at 4° C. (MES buffer is judged to be more effective in the immobilization of antibodies on the microrods).

2-2-2. Use of Succinic Anhydride

The following materials were used: amine MicroDisk, (amine free) dimethylformamide (DMF), succinic anhydride, triethylamine (TEA), and ultrapure water (DW).
1. Wash 2-3 times with 99% ethanol.
2. Bake at 95° C. for >5 min to completely remove the ethanol.
3. Wash once with DMF.
4. Add the following composition to a tube:
   succinic anhydride (SA) 0.12 g/ml (dissolved in DMF) 100 μl
   triethylamine (TEA) 16 μl
   DMF (free) 600 μl
   Total 716 μl
5. React at room temperature for 2 h while inverting the tube up and down (or with shaking at 900 rpm for 2 h).
6. Wash with 1) DMF (1 ml, 2×), 2) ethanol (1 ml, 2×), and 3) DW (1 ml, 2×) in this order.
7. Repeat 3-6 once.
8. Remove DW and store in IVIES buffer (0.1 M IVIES pH 5.0, Thermo Fisher Scientific, 28390) or PBS buffer at 4° C. (MES buffer is judged to be more effective in the immobilization of antibodies on microrods).

Example 3. Immobilization of Capture Antibodies and Determination of Degree of Immobilization of the Capture Antibodies 3-1. —COOH Activation
1. Less than 20,000 microrods (~12,000) were transferred to a new E-tube.
2. After the microrods placed on one side of the wall using a magnetic bar, the microrods were washed once with 500 μl of MES buffer (pH 5.0). Here, it is preferable to perform both vortexing and centrifugation.
3. The composition (total 200 μl) shown in Table 1 was added to a 1.5 ml E-tube. placed on one side of the

TABLE 1

| 75 μm rod beads | ≤ 20,000 (~ 12,403) |
|---|---|
| MES buffer [2-(N-morpholino) ethanesulfonic acid | 160 μl |
| EDC (0.001 g/20 μl MES buffer) | 20 μl |
| NHS (0.001 g/20 μl MES buffer) | 20 μl |
| Total | 200 μl |

4. The E-tube was shaken slowly at room temperature for 30 min (at 30 rpm in a rotating machine).

5. After the microrods placed on one side of the wall using a magnetic bar, the microrods were washed twice with 500 μl of MES buffer. Here, it is preferable to perform both vortexing and centrifugation.

3-2. Immobilization of Capture Antibodies
1. After completion of the washing, the MES buffer was completely removed from the E-tube.
2. 300 μl of MES buffer and 10 μg of cAb were added, followed by slow shaking at room temperature for 2 h (at 30 rpm in a rotating machine).
3. After the microrods placed on one side of the wall using a magnetic bar, the microrods were washed twice with 0.1% BSA/PBS (with 0.1% Tween20, 0.05% sodium azide) (each 500 μl). Here, it is preferable to perform both vortexing and centrifugation.

3-3. Blocking
1. After completion of the washing, the 0.1% BSA/PBS (with 0.1% Tween20, 0.05% sodium azide) was completely removed from the E-tube.
2. 500 μl of 1% BSA/PBS (with 0.1% Tween20, 0.05% sodium azide) was added, followed by slow shaking at room temperature for 1 h (at 30 rpm in a rotating machine).
3. After placed on one side of the wall using a magnetic bar, the microrods were washed twice with 0.1% BSA/PBS buffer (each 500 μl). Here, it is preferable to perform both vortexing and centrifugation.
X̶.̶300 μl of 1% BSA/PBS (with 0.1% Tween20, 0.05% sodium azide) was added and stored at 4° C.

3-4. Binding and Identification of Detection Antibodies
1. After blocking, the microrods were placed in two new 1.5 ml E-tubes (each ~120 microrods) and the supernatant was discarded.
2. 100 μl of 0.1% BSA/PBS buffer was added, the microrods were sufficiently mixed, and the 0.1% BSA/PBS buffer was completely removed.
3. A total of 1 ml of 2 μg/ml biotin-conjugated detection antibodies were prepared using 0.1% BSA/PBS buffer.
4. 100 μl of the detection antibody-marker solution was added to each of the two tubes from which the 0.1% BSA/PBS buffer had been removed in 2, followed by slow shaking at room temperature for 1 h (at 30 rpm in a rotating machine).
5. After the microrods placed on one side of the wall using a magnetic bar, the microrods were washed twice with 0.1% BSA/PBS buffer solution (each 300 μl).
6. The concentration of e-fluor phosphors was adjusted to 2 μg/ml with 0.1% BSA/PBS buffer, 100 μl of the e-fluor phosphor solution was added to each tube, followed by slow shaking for 30 min.
7. After washing twice with 300 μl of 0.1% BSA/PBS buffer, only ~20 microrods per well were placed in a strip.
8. The strip was measured with a brightness of 51 and an exposure of −1 in a measuring instrument. A determination was made by fluorescence measurement as to whether the antibodies were well placed on the magnetic beads.

FIG. 9 shows the uniformity and intensity (amount) of the antibodies immobilized onto the microrods. Specifically, FIG. 9 shows a bright field microscopy image (left) and a fluorescence microscopy image (right) after the detection antibody-phosphor conjugates were bound to the microrod complexes in which the capture antibodies were immobilized on the surface of the microrods.

The results obtained in Examples 1-3 concluded that the use of the inventive microrods enables rapid testing due to the promoted reactions and multiplexed detection with high accuracy.

Thus, the inventive microrods were used to test the following types of antigens.

Experimental Example 1. Test on Thyroid Stimulating Hormone 1-1. Confirmation of Surface Immobilization of Thyroid Stimulating Hormone (TSH) Antibodies on the Magnetic Particles Thyroid stimulating hormone antibodies were purchased from Aviva (Capture (cat. No. 02927)) and used for TSH detection. Following the procedures of Examples 1-3, the antibodies were immobilized onto 2,500 magnetic particles and the immobilized antibodies were identified (Quality Control, QC). The average fluorescence value of the magnetic particles was 84/140, as measured using a Nikon fluorescence microscope (lens magnification: 4×, exposure value: 200 ms, gain values: 5.1 and 11.4), indicating that the amount of the antibodies required for immune reactions was immobilized. The standard deviation between the magnetic particles was as low as 10/11, indicating that the antibodies were evenly immobilized on the particles.

FIG. 10 shows bright field microscopy images and fluorescence microscopy images taken after the TSH antibodies were immobilized on the surface of the magnetic particles.

1-2. Reactions of Thyroid Stimulating Hormone (TSH) at Different Concentrations

TSH (LEE biosolution, cat. No. 996-51) protein was diluted to concentrations of 0, 0.1, 0.5, 1, 2.5, 5, 10, and 20 µIU/ml with TSH free serum (Biospacific, ca. P11000). C1 (1 µIU/ml) and C2 (10 µIU/ml), whose concentrations were already known, were prepared as controls.

The antibody-immobilized magnetic particles were added to 500 µl of TSH serum solution in an E-tube, incubated with stirring on a shaker at 30 rpm at room temperature for 1 h, and washed twice with 500 µl of a washing solution (0.1% BSA/PBS buffer containing 0.1% Tween20, 0.05% sodium azide). 2 µg/ml biotin conjugated TSH secondary antibodies (AVIVA, ca00724) were added to the reaction solution (0.1% BSA/PBS buffer), incubated with stirring at 200 rpm at room temperature for 1 h, and washed twice as described above. Finally, 500 µl of 2 µg/ml SAPE (ThermoFisher Scientific. cat. no S866) as a fluorescent solution was put into the reacted magnetic particles and stirred at 200 rpm at room temperature for 30 min for the fluorescence reaction of the biotin conjugated to the secondary antibodies with the SAPE. Thereafter, bright field microscopy images and fluorescence microscopy images were taken using a fluorescence microscope to obtain fluorescence values of the magnetic particles at the different concentrations and calculate the TSH concentrations therefrom.

Based on the principle that a higher concentration of the target diagnostic marker leads to a stronger fluorescence signal from the magnetic particles, the locations of the magnetic macroparticles in the reaction wells were identified with a bright field microscope and fluorescence signals from the corresponding locations were measured in pixels. The measured fluorescence signals were averaged. The averages were calculated for 30 or more magnetic particles and the medium value of the fluorescence values for 30 magnetic beads was obtained. The target material at different concentrations was allowed to react. Fluorescence values were measured in the same manner as described above. A standard curve was drawn from the measured fluorescence values. Fluorescence values from the test detection were applied to the standard curve to calculate the detection concentration of the corresponding target protein in the final sample. Here, the concentration was calculated using a correlation trend line drawn using the fluorescence intensities and the TSH concentrations. All images were analyzed and fluorescence values were calculated using the automatic image analysis program of the analyzer. As a result, 0-20 µIU/ml TSH could be quantified by fluorescence measurement based on the performance of the developed magnetic beads and could be compared with the already known concentrations of TSH in C1/C2. FIG. 11 shows fluorescence intensities at the different TSH concentrations.

The experimental data shown in FIG. 11 reveal that the experimental concentrations were highly correlated with the fluorescence intensities (R2: 0.9979) and the fluorescence value at 0.1 µIU/ml TSH was different from that at 0 µIU/ml TSH. The TSH experimental results using the magnetic particles concluded that the limit of detection (LOD) is 0.1 µIU/ml.

Considering that the normal TSH concentration range is 0.5-5.0 µIU/ml, the sensible experimental data obtained at this concentration increase the likelihood of success in the commercialization of the magnetic particles. For reference, subjects with TSH levels below 0.5 µIU/ml are diagnosed as having TSH deficiency and subjects with TSH levels above 5 µIU/ml are diagnosed as having TSH overproduction.

The TSH-containing external serum controls C1 (1 µIU/ml) and C2 (10 µIU/ml) were tested using the magnetic bead system. As a result, C1 and C2 were calculated to have TSH concentrations of 1.07 µIU/ml and 10.89 µIU/ml, respectively, demonstrating that the serum TSH levels were accurately detected.

Experimental Example 2. Human γ-Interferon 2-1. Confirmation of Surface Immobilization of Human γ-Interferon Antibodies on the Magnetic Particles Human γ-interferon antibodies were purchased from ThermoFisher Scientific (cat. no. M700A) and used for human γ-interferon detection. Following the procedures of Examples 1-3, the antibodies were immobilized onto 2,500 magnetic particles and the immobilized antibodies were identified (Quality Control, QC). The average fluorescence value of the magnetic particles was 82.33/145.18, as measured using a Nikon fluorescence microscope (lens magnification: 4×, exposure value: 200 ms, gain values: 5.1 and 11.4), indicating that the amount of the antibodies required for immune reactions was immobilized. The standard deviation between the magnetic particles was as low as 9.50/10.11, indicating that the antibodies were evenly immobilized on the particles.

FIG. 12 shows bright field microscopy images and fluorescence microscopy images taken after the human γ-interferon antibodies were immobilized on the surface of the magnetic particles.

2-2. Reactions of Human γ-Interferon

Human IFN-γ (ThermoFisher Scientific/cat. no. RIFNG100) protein was diluted to concentrations of 0, 10, 25, 50, 100, 500, and 1000 pg/ml with 0.1% BSA/PBS buffer containing 0.1% Tween20.

The antibody-immobilized magnetic particles were added to 500 µl of human IFN-γ TSH solution in an E-tube, incubated with stirring on a shaker at 30 rpm at room temperature for 1 h, and washed twice with 500 µl of a washing solution (0.1% BSA/PBS buffer containing 0.1%

Tween20, 0.05% sodium azide). 2 µg/ml biotin conjugated TSH secondary antibodies (AVIVA, ca00724) were added to the reaction solution (0.1% BSA/PBS buffer), incubated with stirring at 200 rpm at room temperature for 1 h, and washed twice as described above. Finally, 500 µl of 2 µg/ml SAPE (ThermoFisher Scientific. cat. no S866) as a fluorescent solution was put into the reacted magnetic particles and stirred at 200 rpm at room temperature for 30 min for the fluorescence reaction of the biotin conjugated to the secondary antibodies with the SAPE. Thereafter, bright field microscopy images and fluorescence microscopy images were taken using a fluorescence microscope to obtain fluorescence values of the magnetic particles at the different concentrations and calculate the TSH concentrations therefrom.

Based on the principle that a higher concentration of the target diagnostic marker leads to a stronger fluorescence signal from the magnetic particles, the locations of the magnetic macroparticles in the reaction wells were identified with a bright field microscope and fluorescence signals from the corresponding locations were measured in pixels. The measured fluorescence signals were averaged. At that time, the fluorescence imaging conditions were 1×lens/exposure time: 200 ms/gain value: 31. The averages were calculated for 30 or more magnetic particles and the medium value of the fluorescence values for 30 magnetic beads was obtained. The target material at different concentrations was allowed to react. Fluorescence values were measured in the same manner as described above. A standard curve was drawn from the measured fluorescence values. Fluorescence values from the test detection were applied to the standard curve to calculate the detection concentration of the corresponding target protein in the final sample. Here, the concentration was calculated using a correlation trend line drawn using the fluorescence intensities and the TSH concentrations. All images were analyzed and fluorescence values were calculated using the automatic image analysis program of the analyzer. As a result, 0-1000 pg/ml human γ-interferon could be quantified by fluorescence measurement based on the performance of the developed magnetic beads. FIG. 13 shows bright field microscopy images and fluorescence microscopy images at the different γ-interferon concentrations, which were taken with a 1×lens for an exposure time of 200 ms, and the measured fluorescence intensities.

The experimental data shown in FIG. 13 reveal that the experimental concentrations were highly correlated with the fluorescence intensities (R2: 0.9934). From these results, it is believed that the dynamic range is 3-5 logs or more, demonstrating that precise immunodiagnosis can be achieved at most of the concentrations.

In addition, the fluorescence value at 10 pg/ml human γ-interferon was different from that at 0 pg/ml human γ-interferon. The human γ-interferon experimental results using the magnetic particles concluded that the limit of detection (LOD) is 10 pg/ml or less.

2-3. Limit of Detection (LOD) for Human γ-Interferon

Considering the result of Experimental Example 2-2 that the limit of detection (LOD) of the magnetic particles for human γ-interferon is 10 pg/ml or less, LOD tests were conducted on low concentrations (0, 0.625, 1.25, and 2.5 pg/ml) of human γ-interferon. The procedure of Experimental Example 2-2 was repeated except that the exposure time was changed from 200 ms to 300 ms to detect fluorescence values. FIG. 14 shows bright field microscopy images and fluorescence microscopy images taken with a 1×lens for an exposure time of 300 ms, and the measured fluorescence intensities.

Referring to FIG. 14, the R2 value of human γ-interferon was 0.9958, high correlation values were observed even in the low concentration range of 0-2.5 pg/ml, and the fluorescence value at 0 pg/ml human γ-interferon was different from that at 0.625 pg/ml human γ-interferon. The human γ-interferon experimental results using the magnetic particles concluded that the limit of detection (LOD) is 0.625 pg/ml, which is considered to be about 40 times better than the sensitivity (LOD 20 pg/ml) of general immunodiagnostic systems using magnetic particle.

2-4. Multiplexed Immunodiagnostics

Since multiplexed immunodiagnostics can measure many markers at a time, it has the advantages of short time, low cost, and high diagnostic accuracy (Multiplex Immunoassays utilizing differential affinity using Aptamers generated by MARAS (2017), 7:6397). The inventive magnetic particles can be produced to have different lengths (200, 300, and 400 µm) and can thus be used for multiplexed immunodiagnostics. Magnetic particles having three different lengths were immobilized with three different types of cytokines to test whether multiplexed immunodiagnostics was possible. The 200 µm long magnetic particles were used for TNF a immunodiagnosis (Recombinant human TNF a, ThermoFisher Scientific, cat. no. RTNFAI/Capure Ab: eBioscience, cat. no. 14-7348-81//Detection Ab: biotin conjugated, eBioscience, cat. no. 13-7349-81), the 300 µm long magnetic particles were used for IFN-γ immunodiagnosis (as in Experimental Example 2-2), and the 400 µm long magnetic particles were used for IL-10 immunodiagnosis (Recombinant human IL-10, ThermoFisher Scientific, cat No. RIL1025/Capture Ab: ThermoFisher Scientific, cat. no. M010/Detection Ab: ThermoFisher Scientific, cat. no. M011B). The same procedure as in Experimental Example 2-2 for human γ-interferon was repeated. After only one type of IFN-γ or IL-10 cytokine was added, a test was conducted to determine whether the magnetic particles were immobilized and reacted with the added cytokine. As a result, only the 300 µm long magnetic particles reacted with IFN-γ (50 pg/ml, 500 pg/ml) to give concentration-dependent signals. Only the 400 µm long magnetic particles reacted with IL-10 (50 pg/ml, 500 pg/ml) to give concentration-dependent signals. FIG. 15 shows the results of the experiment to confirm whether the IFN-γ and IL-10 cytokines immobilized onto the magnetic particles could be used for multiplexed immunodiagnostics.

In conclusion, the immunodiagnostic system using the magnetic particles is suitable for multiplexed diagnosis.

The invention claimed is:

1. Microparticles for detecting biological materials, each of which comprises:
  a core-shell structured microparticle consisting of a core comprising a magnetically responsive metal and a shell layer surrounding the core and having a uniform thickness; and
  capture probes introduced onto the shell layer to capture biological materials,
  wherein,
  the shell layer is made of glass and has surface functional groups, wherein the surface functional groups are silanol groups, carboxyl groups, amino groups, or hydroxyl groups derived from the silanol groups,
  the core occupies 60% or more of the total volume of the core-shell structured microparticle, and
  the microparticle is configured such that a detection limit is less than 10,000 µg/mL and a dynamic range is log 3 or more.

2. The microparticles according to claim 1, wherein the magnetically responsive metal comprises an iron, nickel, cobalt or manganese alloy.

3. The microparticles according to claim 1, wherein the core-shell structure is formed by applying a liquid shell component to the core metal or filling the core metal component in a hollow frame.

4. The microparticles according to claim 1, wherein the shell layer is formed by solidification of an organic or inorganic coating solution.

5. The microparticles according to claim 1, wherein the average surface roughness ($R_a$) of the shell layer is 15 nm or less.

6. The microparticles according to claim 1, wherein the thickness of the shell layer is 1 to 100 μm.

7. The microparticles according to claim 1, wherein the core-shell structured microparticles are obtained by cutting glass-coated metal microwires.

8. The microparticles according to claim 1, wherein the core-shell structured microparticle has a size and specific gravity such that it is not suspended in water.

9. The microparticles according to claim 1, wherein the core-shell structured microparticles are in the form of microrods.

10. The microparticles according to claim 9, wherein the microrods have a length of 10 to 1,000 μm.

11. The microparticles according to claim 9, wherein the aspect ratio of the microrods is at least 2.

12. The microparticles according to claim 1, wherein the biological materials are biomarkers in sample solutions derived from living organisms.

13. The microparticles according to claim 1, wherein the capture probes are linked to the surface functional groups of the shell layer.

14. A method for preparing microparticles for detecting biological materials, comprising: providing core-shell structured microparticles, each of which consists of a core comprising a magnetically responsive metal and a shell layer surrounding the core and having a uniform thickness; and introducing capture probes for capturing biological materials onto the shell layer.

15. A method for detecting biological materials, comprising: (a) providing the microparticles according to claim 1; (b) providing detection probes capable of specific binding to biological materials and conjugated with a luminescent material emitting light in response to an external stimulus; (c) allowing the capture probes, the biological materials, and the detection probes to react with one another to form complexes of the microparticles, the biological materials, and the detection probes; and (d) measuring luminescence signals emitted from the luminescent material present in the complexes in response to the external stimulus to detect the biological materials.

16. The method according to claim 15, wherein the formation of the complexes comprises promoting the reactions in the presence of an external magnetic force.

17. The method according to claim 16, wherein the method is intended for multiplexed detection of two or more types of biological materials using two or more types of microparticles.

18. The method according to claim 17, wherein the multiplexed detection comprises reading the microparticles labeled with length, diameter, thickness, shape, color or identification codes so as to be distinguished from each other.

19. The method according to claim 15, wherein the microparticles are in the form of microrods.

* * * * *